(12) United States Patent
Lee et al.

(10) Patent No.: US 7,366,150 B2
(45) Date of Patent: Apr. 29, 2008

(54) INDOOR LOCAL AREA NETWORK SYSTEM USING ULTRA WIDE-BAND COMMUNICATION SYSTEM

(75) Inventors: Sang-Il Lee, Seoul (KR); Yun-Je Oh, Yongin-shi (KR); Jong-Hun Lee, Suwon-shi (KR); Jong-Hwa Lee, Suwon-shi (KR); Seo-Won Kwon, Suwon-shi (KR); Yun-Kyung Oh, Seoul (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 818 days.

(21) Appl. No.: 10/658,630

(22) Filed: Sep. 9, 2003

(65) Prior Publication Data
US 2004/0233877 A1    Nov. 25, 2004

(30) Foreign Application Priority Data
May 20, 2003    (KR)    ............ 10-2003-0031970

(51) Int. Cl.
*H04Q 7/24* (2006.01)
*H04Q 7/20* (2006.01)
*H04B 10/20* (2006.01)
*H04J 14/00* (2006.01)

(52) U.S. Cl. .............. 370/338; 398/58; 455/426.1
(58) Field of Classification Search ........... 370/328, 370/338, 465, 466; 398/58, 59, 60, 61, 62, 398/63, 64
See application file for complete search history.

(56) References Cited

U.S. PATENT DOCUMENTS 6,895,185 B1 *  5/2005  Chung et al. ............. 398/72

(Continued)

FOREIGN PATENT DOCUMENTS

CN    1372773    10/2002

(Continued)

OTHER PUBLICATIONS

Izadpanah, H. "A Millimeter-Wave Broadband Wireless Access Technology Demonstrator for the Next-Generation Internet Network Reach Extension." IEEE Communications Magazine, IEEE Service Center. Piscataway, NJ. vol. 30. No. 9. Sep 2001. pp. 140-145, XP001107761 ISSN: 0163-6804.

*Primary Examiner*—Rafael Perez-Gutierrez
*Assistant Examiner*—Simon A Goetze
(74) *Attorney, Agent, or Firm*—Cha & Reiter, LLC

(57) ABSTRACT

An indoor local area network (LAN) system using an ultra wide-band (UWB) communication system is provided. The indoor LAN system includes at least one remote terminal including a UWB module for converting input digital data to be transmitted into an analog signal of an ultra wide-bandwidth and wirelessly transmitting the converted analog signal via an antenna of the remote terminal. The UWB module receives an analog signal of the ultra wide-bandwidth via the antenna and converts the received analog signal into a digital signal. The indoor LAN system further includes at least one access point for performing USB-based wireless communication with the remote terminal in a corresponding area. The access point is adapted to receive the analog signal of the ultra wide-bandwidth transmitted from the remote terminal and convert the received analog signal into an optical signal.

9 Claims, 3 Drawing Sheets

U.S. PATENT DOCUMENTS

| | | |
|---|---|---|
| 7,068,937 B1 * | 6/2006 | Combs et al. ................. 398/72 |
| 2001/0033610 A1 * | 10/2001 | Chastain ..................... 375/219 |
| 2002/0048071 A1 * | 4/2002 | Suzuki et al. ............... 359/173 |
| 2003/0007214 A1 * | 1/2003 | Aburakawa et al. ........ 359/145 |
| 2003/0054764 A1 * | 3/2003 | McCorkle et al. ............. 455/40 |
| 2003/0081630 A1 * | 5/2003 | Mowery et al. ............. 370/466 |
| 2003/0161382 A1 * | 8/2003 | Hershey et al. ............. 375/130 |
| 2003/0227980 A1 * | 12/2003 | Batra et al. ................. 375/295 |
| 2004/0033075 A1 * | 2/2004 | Koch et al. ................... 398/58 |
| 2004/0047631 A1 * | 3/2004 | Takatori et al. ............... 398/71 |
| 2004/0175173 A1 | 9/2004 | Deas |
| 2006/0291536 A1 * | 12/2006 | Santhoff et al. ............ 375/130 |

FOREIGN PATENT DOCUMENTS

| | | |
|---|---|---|
| EP | 1250018 A1 | 5/2001 |
| JP | 09-046284 | 2/1997 |
| JP | 09-233050 | 9/1997 |
| JP | 2002-185490 | 6/2002 |

* cited by examiner

INDOOR LOCAL AREA NETWORK SYSTEM USING ULTRA WIDE-BAND COMMUNICATION SYSTEM

CLAIM OF PRIORITY

This application claims priority to an application entitled "INDOOR LOCAL AREA NETWORK SYSTEM USING ULTRA WIDE-BAND COMMUNICATION SYSTEM," filed in the Korean Intellectual Property Office on May 20, 2003 and assigned Serial No. 2003-31970, the contents of which are hereby incorporated by reference.

BACKGROUND OF THE INVENTION

1. Field of the Invention

The present invention relates to a local area network (LAN) system. More particularly, the present invention relates to an indoor LAN system with a data rate of the 10 to 100 Mbps class using an ultra wide-band (UWB) communication system.

2. Description of the Related Art

Generally, a UWB communication system is a wireless communication technique in which large quantities of digital data are transmitted over a wide frequency spectrum at low power within the range of a short distance. A LAN system is a network system capable of performing mutual communication in a local area such as an indoor area, for example, a home, office or hospital. Recently, there have been developed a LAN system using a wireless LAN capable of transmitting and receiving data in a wireless manner that has now become commercially available. More recently, an effort has been made to extend a transmission bandwidth of the wireless LAN in such a LAN system to accommodate the ever-increasing amount of radio data, which currently increases at the ratio of a geometric progression.

Under these conditions at present, the wireless LAN of the LAN system most universally employs a technique capable of providing a maximum data rate of 22 Mbps using an ISM (Industrial, Scientific and Medical) band of the 2.4 GHz class. Also, recently, a technique for providing a maximum data rate of 54 Mbps at a 5 GHz band also has been developed to enhance the data rate of the wireless LAN. Most recently, a wireless LAN technique at a millimeter wave band (30 to 300 GHz) is being developed to provide a higher data rate.

There is currently available commercially a wireless LAN communication system that is generally adapted to employ a radio frequency (RF) of a 2.4 or 5 GHz band as a carrier frequency and transmit data while loading it in the carrier frequency. This communication system provides a maximum data rate of about 54 Mbps. However, in this wireless LAN communication system, data is transmitted with overhead information necessary for transmission of the data contained therein, thereby causing the actual data rate to be reduced to half the provided data rate or less.

Due to this reduction in the data rate, in the case where a plurality of users are connected to the LAN system and conduct communications using the wireless LAN at the same time, the data rate is reduced by the number of the users (the number of communication lines). That is, where a plurality of users communicate, the LAN system that uses wireless LANs has an increased difficulty in transferring data at a high rate.

Accordingly, there is a need for a LAN system using wireless LANs with a higher data rate thank currently available. However, available frequency bands for communication have already been depleted with the FCC issuing licenses to various telecommunication companies, so it is next to impossible for the LAN system to be assigned a new frequency of an RF band to perform wireless communication at a high data rate of 100 Mbps or more. As an alternative, a high-speed wireless communication system using the 30 GHz's or 60 GHz's of the millimeter wave band is being developed, but there is a problem in that the associated parts are difficult to develop owing to the characteristics of small millimeter wave media and the associated communication equipment is higher in cost than the larger wavelength systems. For this reason, the construction of a LAN system for high-speed wireless communication of a wireless LAN using a millimeter wave is not suitable for the environments of homes or small-scale offices, because they require substantial construction of a network system at a low cost that cannot be spread among many users.

FIG. 1 is a block diagram that provides a schematic of the construction of a typical conventional LAN system for high-speed wireless communication. As shown in this drawing, the LAN system comprises a first region 10 and a second region 30 having a respective plurality of remote terminals 12 and 32, a plurality of access points (APs) 20 and 40, and a central unit 50.

The first and second remote terminals 12 and 32 are the subjects of communication and are adapted to transmit signals to the respective first and second access points 20 and 40 to communicate with external terminals.

The first and second access points 20 and 40 are each adapted to connect a wired network and a wireless network with each other to provide an interface between a wireless terminal and the wired network so as to enable transmission and reception of data therebetween. These first and second access points 20 and 40 function to extend a communicatable range of the overall network system. As a result, in a similar manner to mobile phones, while in transit, the terminals 12 and 32 can roam between the access points 20 and 40 while maintaining connections therewith. The access points 20 and 40 can also function as wireless base stations. That is, the access points 20 and 40 each have an antenna function, a radio signal processing/managing function, and a wired network/wireless network interfacing function.

The central unit 50 is adapted to perform a routing function of switching data from the remote terminals to destinations.

Next, the communication procedure between the first remote terminal 12 located in a first region 10 and the second remote terminal 32 located in a second region 30 will be discussed. Each of the remote terminals 12 and 32 and each of the access points 20 and 40 communicate with each other in a wireless manner, and each of the access points 20 and 40 and the central unit 50 communicate with each other in a wired manner.

The first remote terminal 12 performs a D/A funcion by converting a digital signal that is into an analog signal of an ultra wide-bandwidth, and wirelessly transmits the converted analog signal via its antenna to the first access point 20 which manages network communication of the first region. To this end, the first remote terminal 12 includes a UWB module 14.

The first access point 20 subsequently receives the analog signal of the ultra wide-bandwidth wirelessly transmitted from the first remote terminal 12. The received analog signal is then converted into a digital signal. Finally, the first access point 20 transfers the converted digital signal to the central unit 50 by wire. In order to perform the foregoing, the first access point 20 includes a low-noise amplifier 22, a UWB module 24 and a transmission module 26.

The low-noise amplifier 22 amplifies the analog signal of the ultra wide-bandwidth (with low noise generation) received at an antenna of the first access point 20 to raise a signal-to-noise ratio thereof. The UWB module 24 converts the low-noise amplified analog signal of the ultra wide-bandwidth into a digital signal. The transmission module 26 transfers the digital signal converted by the UWB module 24 to the central unit 50 by wire.

The central unit 50 then receives the digital signal transferred from the first access point 20. The received digital signal is retransferred to a destination. In order to perform the foregoing, the central unit 50 includes a transfer module 52 and a route setting module 54.

The transfer module 52 first receives a digital signal transferred from each of the access points 20 and 40 and then re-transfers the received digital signal to a destination remote terminal corresponding to a control command from the route setting module 54. The route setting module 54 determines a destination to which the received digital signal is to be transferred, then sets up a transfer path of the digital signal in accordance with the determined result, and then controls the transfer module 52 to transfer the digital signal along the set-up path. Here, the transfer path may be, for example, a transfer path from the first remote terminal 12 to the second remote terminal 32. In this regard, in response to the control command from the route setting module 54, the transfer module 52 transfers the digital signal to the second access point 40 which manages network communication of the second region where the second remote terminal 32 is located.

In the second access point 40, a transmission module 46 receives the digital signal transferred from the central unit 50 and transfers the received digital signal to a UWB module 44. The UWB module 44 converts the digital signal from the transmission module 46 into an analog signal of the ultra wide-bandwidth. Subsequently, the newly converted UWB is then wirelessly transmitted to the second remote terminal 32 via a low-noise amplifier 42 and antenna of the second access point 40. In the second remote terminal 32 a UWB module 34 receives the analog signal of the ultra wide-bandwidth transmitted from the second access point 40 via an antenna of the second remote terminal 32, and converts the received analog signal into a digital signal. After the conversion is complete, the second access point 40 of the second remote terminal 32 then sends the converted digital signal to an associated signal processing module (not shown) provided in the second remote terminal 32.

However, the above-mentioned conventional network system has several disadvantages in that the access points 20 and 40 each must have such a complex structure that it is composed of the low-noise amplifier 22 or 42, UWB module 24 or 44 and transmission module 26 or 46. Further, the access points 20 and 40 have high production costs because of such complex structures to perform all of the required functions.

SUMMARY OF THE INVENTION

Therefore, the present invention has been made in view of the above problems, and it is an object of the present invention to provide an indoor LAN system that is capable of performing local-area high-speed wireless communication of the 100 Mbps class using an ultra wide-bandwidth signal.

It is another object of the present invention to provide an indoor LAN system that performs local-area high-speed wireless communication of the 100 Mbps class using an ultra wide-bandwidth signal and has simple and inexpensive access points that manage small-scale LANs by regions.

The present invention permits the above (and other) objects to be accomplished by providing an indoor local area network (LAN) system comprising at least one remote terminal including an ultra wide-band (UWB) module for converting input digital data to be transmitted into an analog signal of an ultra wide-bandwidth. The remote terminal also wirelessly transmits the converted analog signal via an antenna of the remote terminal and the UWB module receives an analog signal of the ultra wide-bandwidth via the antenna. The received analog signal is subsequently converted into a digital signal. There is also at least one access point for performing USB-based wireless communication with the remote terminal in a corresponding area; the access point receives the analog signal of the ultra wide-bandwidth transmitted from the remote terminal and converts the received analog signal into an optical signal. A central unit is connected with the access point via an optical cable, so that the central unit (i) receives the optical signal converted by the access point, (ii) converts the received optical signal into a digital signal, (iii) determines a destination of the converted digital signal, and (iv) transmits the digital signal to the determined destination.

The access point may preferably include an optical transmitter and an optical receiver. The optical transmitter receives the analog signal of the ultra wide-bandwidth transmitted from the remote terminal, converts the received analog signal into an optical signal and transmits the converted optical signal to the central unit via the optical cable. The optical receiver then receives the optical signal transmitted from the central unit, converts the received optical signal into an analog electrical signal of the ultra wide-bandwidth and wirelessly transmits the converted analog electrical signal to a remote terminal of the determined destination.

Preferably, the central unit includes an optical transmitter/receiver module, a UWB module and a routing module. The optical transmitter/receiver module receives the optical signal from the optical transmitter, converts the received optical signal into an electrical signal and sends the converted electrical signal to the UWB module. The UWB module receives the electrical signal converted by the optical transmitter/receiver module, converts the received electrical signal into a digital signal and sends the converted digital signal to the routing module. The routing module determines a destination of the digital signal converted by the UWB module from the digital signal, sets up a transfer path of the digital signal based on the determined result and sends the digital signal to the UWB module with information regarding the transfer path contained therein.

Further, the UWB module converts the digital signal containing the information regarding the transfer path set up by the routing module into an analog electrical signal of the ultra wide-bandwidth and sends the converted analog electrical signal to the optical transmitter/receiver module. The optical transmitter/receiver module converts the analog electrical signal converted by the UWB module into an optical signal and transmits the converted optical signal to an access point for management of a network to which a destination remote terminal corresponding to the transfer path information belongs.

On the other hand, upon determining from the digital signal converted by the UWB module that the destination of the digital signal is not a terminal in a network managed by the access point connected with the central unit via the optical cable, the routing module transfers the digital signal containing the transfer path information to an outdoor network connected with the central unit and adapted to manage communication of a destination remote terminal corresponding to the transfer path information.

According to an aspect of the present invention, a high-speed indoor wireless network with a data rate of the 100 Mbps class can be constructed using a UWB communication system and an optical communication system without separately assigning a frequency of an RF band, resulting in an increase in the utility of that particular frequency band. Further, in the case of configuring a LAN using an ultra wide-bandwidth signal, an access point is provided with an optical transmitter/receiver module to transmit an input ultra wide-bandwidth signal to a central unit via an optical cable. Therefore, the access point can be low in cost and simple in construction. Furthermore, a high-speed indoor wireless network with a data rate of the 100 Mbps class using a UWB communication system capable of performing local-area transmission within the range of about 10 m can be constructed by implementing each sub-network with the UWB communication system and connecting it with a central unit via an optical cable. In this regard, an access point provided in each sub-network is composed of an optical transmitter/receiver module, so it can transmit an analog signal of an ultra wide-bandwidth received from an associated remote terminal to the central unit in optical signal form just as it was. As a result, an access point, which must be installed in every sub-network, is provided with a low-cost optical transmitter/receiver module, thereby making it possible to construct the indoor network system using the UWB communication system at a low cost.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
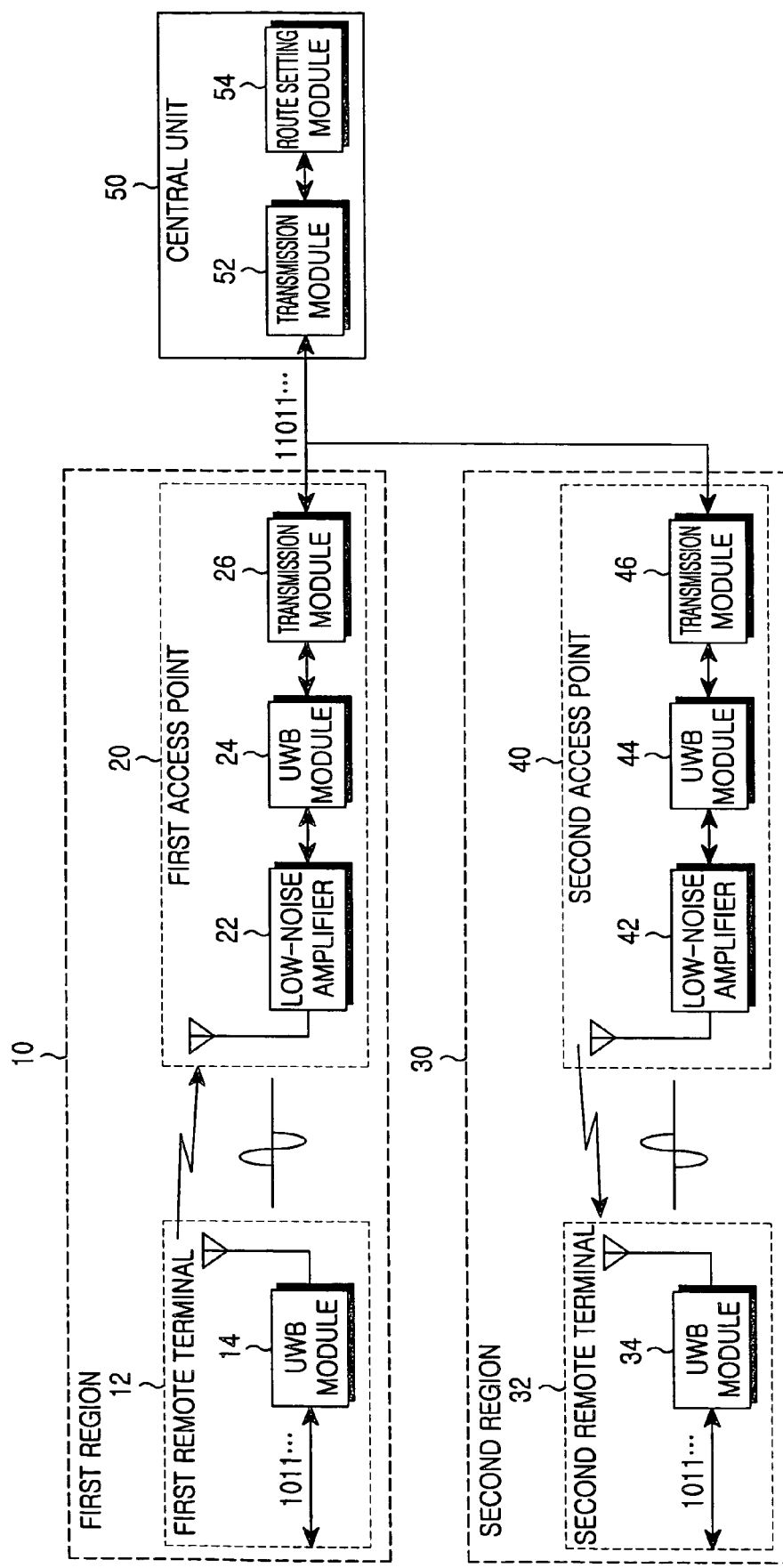
FIG. 1 is a block diagram schematically showing the construction of a conventional LAN system for high-speed wireless communication.

Now, preferred aspects of the present invention will be described in detail with reference to the annexed drawings. In the drawings, the same or similar elements are often denoted by the same reference numerals even though they are depicted in different drawings. In the following description, a variety of specific elements such as those of various discrete circuits are shown only for purposes of illustration, and not for limitation. Thus a person of ordinary skill in the art understands that the invention is not limited to the specific hardware shown and there are equivalent circuits that could be used to practice the invention that do not depart from the spirit and the scope of the invention. Those skilled in the art will appreciate that the present invention can be implemented without using the above-mentioned specific elements. In addition, in the following description of the present invention, a detailed description of known functions and configurations incorporated herein will be omitted when it may obscure the subject matter of the present invention, rather than elucidate.

Figure 2:
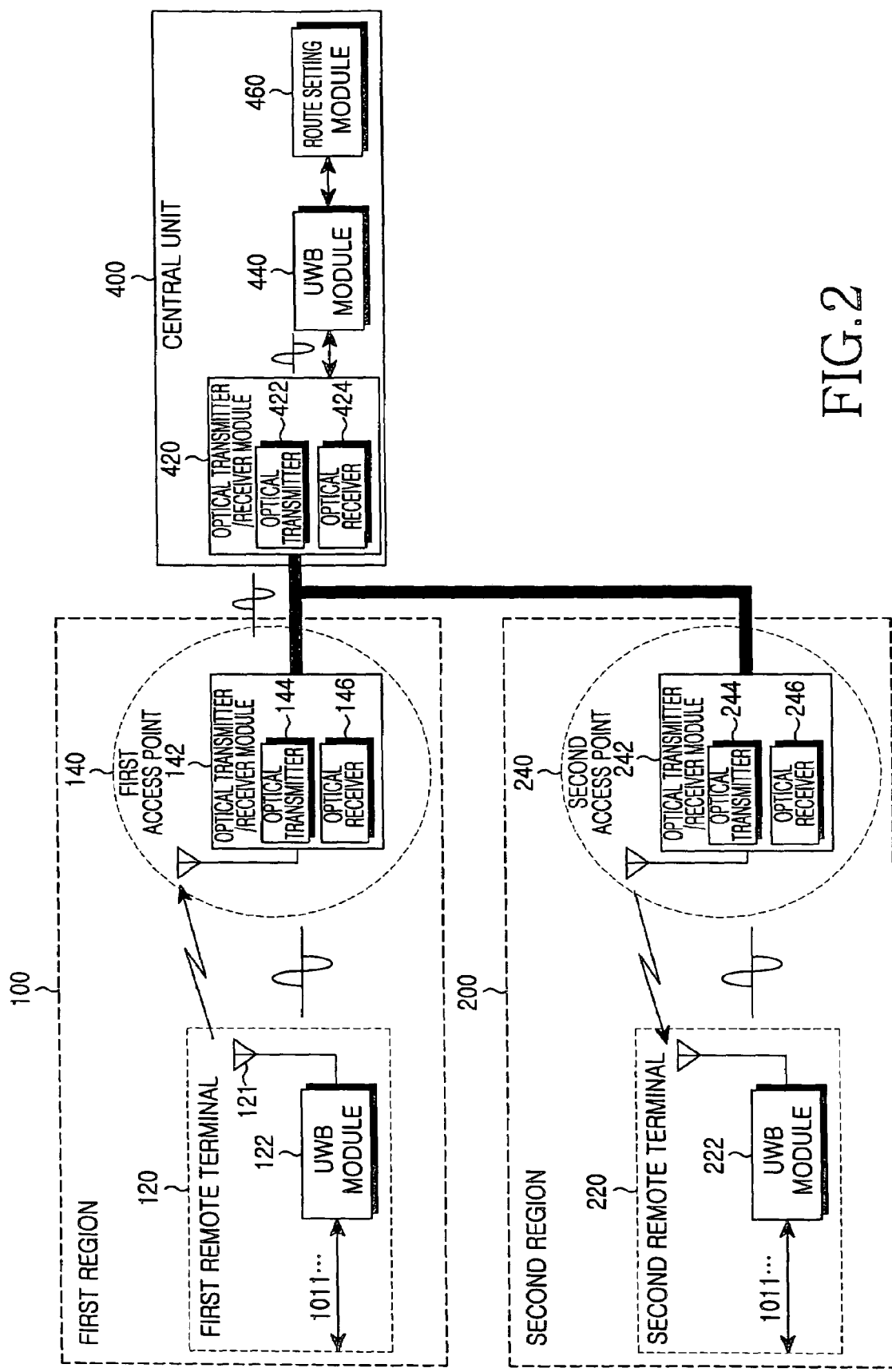
FIG. 2 is a block diagram showing a preferred embodiment of a high-speed LAN system using an ultra wide-bandwidth signal in accordance with the present invention.

With reference to FIG. 2, there is shown in block form a preferred aspect of a high-speed LAN system using an ultra wide-bandwidth signal in accordance with the present invention.

As shown in FIG. 2, the high-speed LAN system comprises a first remote terminal 120 and first access point 140 arranged in a first region 100. In a second region 200, there is arranged a second remote terminal 220 and second access point 240. A central unit 400 is in communication with both regions and provides a communication path for input data.

In the first region 100, the first remote terminal 120 is adapted to convert input digital data to be transmitted into an analog signal of an ultra wide-bandwidth by UWB module 122 arranged within the first remote terminal. Moreover, the first remote terminal also wirelessly transmits the converted analog signal via its antenna 121.

First access point 140 is adapted to receive the analog signal wirelessly transmitted in ultra wide-bandwidth from the first UWB module 122 of remote terminal 120. In turn, the first access point transmits the received analog signal to the central unit 400. Preferably, each of the access points 140 and 240 and the central unit 400 are interconnected via a transmission medium such as an optical cable.

The first access point 140 includes an optical transmitter/receiver module 142 that converts an input electrical signal into an optical signal. Conversely, the module 142 also converts an input optical signal into an electrical signal. The optical transmitter/receiver module 142 includes an optical transmitter 144 and an optical receiver 146.

The optical transmitter 144 acts to convert an input electrical signal, or the analog signal of the ultra wide-bandwidth received at an antenna of the first access point 140, into an optical signal and transmit the converted optical signal to the central unit 400 in an analog format via the transmission medium, or the optical cable.

The optical receiver 146 acts to receive an optical signal transmitted from the central unit 400 and convert the received optical signal into an electrical signal. The converted electrical signal is wirelessly transmitted in analog format to a remote terminal located in the first region via the antenna of the first access point 140.

The central unit 400 includes an optical transmitter/receiver module 420, a UWB module 440 and a route setting module 460.

The optical transmitter/receiver module 420 converts an input electrical signal into an optical signal and an input optical signal into an electrical signal, respectively by use of the optical transmitter 422 and an optical receiver 424, which in this particular case are arranged within the transmitter/receiver module 420.

The optical transmitter 422 acts to receive an analog electrical signal of the ultra wide-bandwidth from the UWB module 440, converts the received electrical signal into an optical signal and transmits the converted optical signal to an access point on a corresponding path.

The optical receiver 424 acts to receive the analog optical signal transmitted from the optical transmitter 144 in the first access point 140, converts the received optical signal into an electrical signal, and sends the converted electrical signal to the UWB module 440.

The UWB module 440 acts to receive the analog electrical signal from the optical receiver 424 of the optical transmitter/receiver module 420, converts the received electrical signal into a digital signal and transfers the converted digital signal to the route setting module 460. The UWB module 440 also acts to receive a digital signal from the route setting module 460, converts the received digital signal into an analog signal of the ultra wide-bandwidth and sends the converted analog signal to the optical transmitter/receiver module 420. At this point, the analog signal of the ultra wide-bandwidth converted by the UWB module 440 is an electrical signal. As a result, upon receiving the analog electrical signal of the ultra wide-bandwidth from the UWB module 440, the optical transmitter 422 of the optical transmitter/receiver module 420 converts the received electrical signal into an optical signal and transmits the converted optical signal to a corresponding access point via the transmission medium, or the optical cable.

The route setting module 460 acts to receive the digital signal from the UWB module 440. In addition, the rout setting module also acts to analyze the received digital signal to determine a region to which a destination remote terminal belongs. Furthermore, a transfer path is set up between the digital signal in accordance with the analyzed result so as to transfer the digital signal to an access point which manages a network of the region to which the destination remote terminal belongs. Upon determining that a destination desired by the first remote terminal 120 is a specific terminal connected to an external network, in other words not connected to the LAN, the route setting module 460 transfers the foregoing digital signal to the external network so that the specific terminal can receive the digital signal.

In the present embodiment, the destination of the ultra wide-bandwidth data transmitted from the first remote terminal 120 is described to be the second remote terminal 220 located in the second region of the LAN for illustrative purposes.

In this regard, upon determining from the analyzed result of the received digital signal that the destination of the digital signal is the second remote terminal 220, the route setting module 460 sets up the transfer path of the digital signal based on the determined result. The route setting module 360 accordingly sends the digital signal to the UWB module 440 with the resulting routing information contained therein. The UWB module 440 receives the digital signal containing the routing information sent from the route setting module 460, converts the received digital signal into an analog signal of the ultra wide-bandwidth and transfers the converted analog signal to the optical transmitter/receiver module 420.

If the optical transmitter 422 of the optical transmitter/receiver module 420 receives the analog signal of the ultra wide-bandwidth from the UWB module 440, then it converts the received analog signal, or electrical signal, into an optical signal and transmits the converted optical signal to the second access point 240.

The second access point 240 includes an optical transmitter/receiver module 242 having an optical transmitter 244 and optical receiver 246 which perform the same functions as those in the first access point 140. The optical receiver 246 in the second access point 240 receives the optical signal transmitted from the optical transmitter/receiver module 420 of the central unit 400, converts the received optical signal into an electrical signal and wirelessly transmits the converted electrical signal to the second remote terminal 220 via an antenna of the second access point 240. Upon receiving an electrical signal, or the analog signal of the ultra wide-bandwidth, transmitted from the second access point 240 via an antenna of the second remote terminal 220, a UWB module 222 of the second remote terminal 220 converts the received analog signal into a digital signal and then sends the converted digital signal to an associated signal processing module provided in the second remote terminal 220. Thus, the operation of the components in the second access point is similar to that of the components in the first access points.

Accordingly, in the case of configuring a LAN using an ultra wide-bandwidth signal, the particular access point is provided with an optical transmitter/receiver module to transmit an input ultra wide-bandwidth signal to the central unit 400 via an optical cable. Therefore, the access point can be low in cost and simple in construction.

Figure 3:
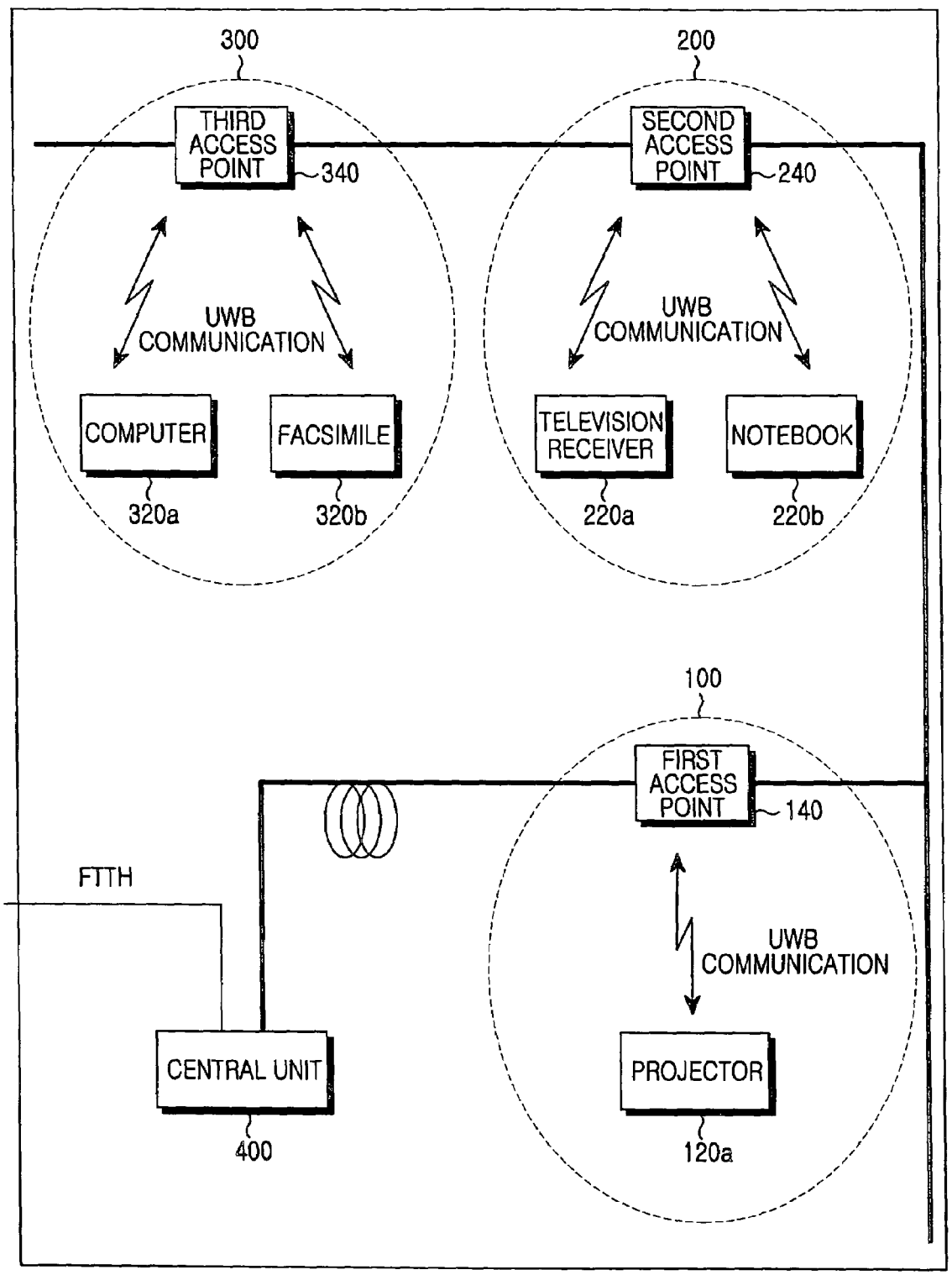
FIG. 3 is a block diagram showing an example of the construction of the LAN system to which the preferred aspects of FIG. 2 is applied.

FIG. 3 is a simplified block diagram showing an example of the construction of the LAN system to which the preferred aspect shown in FIG. 2 may be applied. As shown in this drawing, an indoor optical wireless network using a UWB communication system can be partitioned into two areas. The first area is a wireless network area for connection between remote terminals 120a, 220a, 220b, 320a and 320b and access points 140, 240 and 340 based on the UWB communication system. The second area is an optical network area for connection between the access points 140, 240 and 340 and an indoor central unit 400. The central unit 400 is connected with an external network via FTTH (Fiber To The Home).

The wireless network area in the particular example shown in FIG. 3 is divided into a first area 100, second area 200 and third area 300 according to respective management ranges of the access points 140, 240 and 340. The first area 100, second area 200 and third area 300 are referred to as sub-networks.

In the first area 100, the first access point 140 is in wireless communication with the remote terminal or projector 120a based on the UWB communication system. In the second area 200, the second access point 240 is in wireless communication with the remote terminal or television receiver 220a and the remote terminal or notebook 220b based on the UWB communication system. In the third area 300, the third access point 340 is in wireless communication with the remote terminal or computer 320a and the remote terminal or facsimile 320b based on the UWB communication system.

The central unit 400 and each of the access points 140, 240 and 340 are interconnected via an optical cable. Thus, the access points 140, 240 and 340 each receive an analog signal of an ultra wide-bandwidth from a corresponding one of the remote terminals 120a, 220a, 220b, 320a and 320b, convert the received analog signal into an optical signal, not a digital signal, and transmit the converted optical signal to the central unit 400.

Therefore, a high-speed indoor wireless network with a data rate of the 100 Mbps class using a UWB communication system capable of performing local-area transmission within the range of about 10 m can be constructed by implementing each of the sub-networks 100, 200 and 300 with the UWB communication system and connecting it with the central unit 400 via the optical cable. In this connection, the access points 140, 240 and 340 provided respectively in the sub-networks 100, 200 and 300 are each composed of an optical transmitter/receiver module, so they each can transmit an analog signal of an ultra wide-bandwidth received from a corresponding one of the remote terminals 120a, 220a, 220b, 320a and 320b to the central unit 400 in optical signal form just as it was. As a result, an access point, which must be installed in every sub-network, is provided with a low-cost optical transmitter/receiver module, thereby making it possible to construct the indoor network system using the UWB communication system at a low cost.

As apparent from the above description, it is understood that according to the present invention, a high-speed indoor wireless network with a data rate of the 100 Mbps class can be constructed using a UWB communication system and an optical communication system without separately assigning a frequency of an RF band, resulting in an increase in frequency band utility.

Further, in the case of configuring a LAN using an ultra wide-bandwidth signal, an access point is provided with an optical transmitter/receiver module to transmit an input ultra wide-bandwidth signal to a central unit via an optical cable. Therefore, the access point can be low in cost and simple in construction.

Furthermore, a high-speed indoor wireless network with a data rate of the 100 Mbps class using a UWB communication system capable of performing local-area transmission within the range of about 10 m can be constructed by implementing each sub-network with the UWB communication system and connecting it with a central unit via an optical cable.

In this regard, an access point provided in each sub-network is composed of an optical transmitter/receiver module, so it can transmit an analog signal of an ultra wide-bandwidth received from an associated remote terminal to the central unit in optical signal form just as it was. As a result, an access point, which must be installed in every sub-network, is provided with a low-cost optical transmitter/receiver module, thereby making it possible to construct the indoor network system using the UWB communication system at a low cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An indoor local area network (LAN) system comprising:
   at least a first remote terminal comprising:
   (i) an ultra wide-band (UWB) conversion module for converting input digital data into analog data in an ultra wide-bandwidth far transmission from said at least first remote terminal and converting a received analog signal into a digital signal; and
   (ii) an antenna connected with said UWB module for wirelessly:
      transmitting the converted analog signal from the UWB module in the ultra wide-bandwidth, and receiving an analog signal in an ultra wide-bandwidth;
   at least a first access point for performing UWB-based wireless communication with said first remote terminal in a corresponding area, said access point receiving said analog signal of the ultra wide-bandwidth transmitted from said first remote terminal and converting the received analog signal into an optical signal wherein said access point does not include a UWB module; and
   a central unit in communication with said first access point via an optical cable, said central unit comprising:
   a central unit optical transmitter/receiver module for receiving said optical signal from said first access point optical transmitter and converting the received optical signal into an electrical signal, comprising;
   a UWB module for receiving said electrical signal converted by said optical transmitter/receiver module and converting the received electrical signal into a digital signal; and
   a routing module for determining a destination of said digital signal converted by said UWB module from said digital signal, getting up a transfer path of said digital signal based on the determined result and sending said-digital signal to said UWB module with information regarding said transfer path contained therein.

2. The indoor LAN system as set forth in claim 1, wherein said access point includes:
   a access point optical transmitter for receiving said analog signal of the ultra wide-bandwidth transmitted from, said first remote terminal and for converting the received analog signal into an optical signal and transmitting the converted optical signal to said central unit via said optical cable; and
   an access point optical receiver for receiving an optical signal transmitted from said central unit, converting the received optical signal into an analog electrical signal of the ultra wide-bandwidth and wirelessly transmitting the converted analog electrical signal to a remote terminal of said determined destination.

3. The indoor LAN system as set forth in claim 1, wherein:
   said central unit UWB module is adapted to convert said digital signal containing said information regarding said transfer path set up by said routing module into an analog electrical signal of the ultra wide-bandwidth and send the converted analog electrical signal to said central unit optical transmitter/receiver module; and
   said central unit optical transmitter/receiver module is adapted to convert said analog electrical signal convened by said UWB module into an optical signal and transmit the converted optical signal to said first access point for management of a network to which a destination remote terminal corresponding to said transfer path information belongs.

4. The indoor LAN system as set forth in claim 1, wherein said routing module is adapted to, upon determining from said digital signal converted by said central unit UWB module that said destination of said digital signal is not a terminal in a network managed by said access point connected with said central unit via said optical cable, transfer said digital signal containing said transfer path information to an outdoor network connected with said ventral unit, and manage communication of a destination remote terminal corresponding to said transfer path information.

5. A method for providing an indoor local area network (LAN) system comprising the steps of:
   (a) providing at least a first remote terminal comprising:
   (i) an ultra wide-band (UWB) conversion module for convening input digital data into analog data in an ultra wide-bandwidth for transmission from said at least first remote terminal and converting a received analog signal into a digital signal, and
   (ii) an antenna connected with said UWB module for:
      wirelessly transmitting the converted analog signal from the UWB module of the remote terminal in the ultra wide-bandwidth and receiving an analog signal in an ultra wide-bandwidth via the antenna (b) performing UWB-based wireless communication with said first remote terminal in a corresponding area by at least a first access point, said access point receiving said analog signal of the ultra wide-bandwidth transmitted from said first remote terminal and convening the received analog signal into an optical signal wherein said at least first access point does not include a UWB module; and (c) providing a central unit, including a central unit UWB module and the central unit in communication with said first access point via an optical cable, said central unit;

receiving said optical signal from said first access point optical transmitter and converting the received optical signal into an electrical signal by a central unit optical transmitter/receiver module:

receiving said electrical signal converted by said optical transmitter/receiver module and convening the received electrical signal into a digital signal by the central unit UWB module; and determining a destination of said digital signal converted by said UWB module from said digital signal, setting up a transfer path of said digital signal based on the determined result and sending said digital signal to said UWB module with information regarding said transfer path contained therein by a routing module: wherein said central unit UWB module is adapted to convert said digital signal containing said information regarding said transfer path set un by said routing module into an analog electrical signal of the ultra wide-bandwidth and send the converted analog electrical signal to said central unit optical transmitter/receiver module; and said central unit optical transmitter/receiver module is adapted to convert said analog electrical signal converted by said UWB module into an optical signal and transmit the converted optical signal to said first access point for management of a network to which a destination remote terminal corresponding to said transfer path information belongs.

6. The method as set forth in claim 5, further comprising:

(b) (i) providing an access point optical transmitter for receiving said analog signal of the ultra wide-bandwidth transmitted from said first remote terminal and for converting the received analog signal into an optical signal and transmitting the converted optical signal to said central unit via said optical cable; and (b) (ii) providing an access point optical receiver for receiving an optical signal transmitted from said central unit, converting the received optical signal into an analog electrical signal of the ultra wide-bandwidth and wirelessly transmitting the convened analog electrical signal to a remote terminal of said determined destination.

7. The method as set forth in claim 5, wherein said routing module determines from said digital signal converted by said central unit UWB module that said destination of said digital signal is not a terminal in a network managed by said access point connected with said central unit via said optical cable, transfer said digital signal containing said transfer path information to an outdoor network connected with said central unit, and manage communication of a destination remote terminal corresponding to said transfer path information.

8. An indoor LAN system comprising:

a first area, a second area, and a third area of sub-networks each having respect nodes therein;

a first access point, a second access point, and a third access point, each of the first, second and third access points being associated with a respective area;

a central unit in communication with each of the first, second and third areas and with an external network, comprising:

a central unit optical transmitter/receiver module for receiving said optical signed from said first access point optical transmitter and converting the received optical signal into an electrical signal, comprising:

a UWB module for receiving said electrical signal converted by said optical transmitter/receiver module and converting the received electrical signal into a digital signal; and a routing module for determining a destination of said digital signal converted by said UWB module from said digital signal, setting up a transfer path of said digital signal based on the determined result and sending said digital signal to said UWB module with information regarding said transfer path contained therein;

wherein each of the access points and nodes within a corresponding area communicate via Ultra Wide Band (UWB) communication; and wherein each of the access points and the central unit communicate via optical fiber and the central unit includes a UWB module; and wherein each of the access points includes a optical transmitter/receiver module for converting optical communication from a corresponding area central unit and converting said communication into an analog UWB signal to communicate with at least one of the respective nodes wherein said access points do not include a UWB module.

9. The system according to claim 8, wherein the central unit and the external network communicate via a Fiber To The Home (FTTH) system.

* * * * *